United States Patent Office 3,763,101
Patented Oct. 2, 1973

3,763,101
THERMOSETTING ALICYCLIC ENDO END CAPPED RESINS
Robert J. Jones, Hermosa Beach, and Eugene A. Burns, Palos Verdes Peninsula, Calif., assignors to TRW Inc., Redondo Beach, Calif.
No Drawing. Filed Apr. 3, 1972, Ser. No. 240,798
Int. Cl. C08g 23/20, 25/00
U.S. Cl. 260—47 CP                7 Claims

ABSTRACT OF THE DISCLOSURE

Resins having good thermal and chemical stability are made by curing chemically stable alicyclic endo end capped compounds having oxy or sulfone substituents. The prepolymers are made by reacting proper stoichiometric amounts of an aromatic sulfone or an aromatic ether containing at least two functional substituents wherein the aromatic ring generally functions as both the electron donor or acceptor, depending upon the nature of the substituent used to form the linkage, and end capping with an alicyclic endo compound having the formula

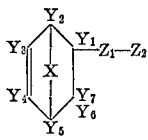

wherein $Y_1$–$Y_7$, inclusive, can be hydrogen, halogen, nitro, aryl, alkyl, alkyl ether, or alkyaryl; X can be carbonyl, oxygen, sulfur, methylene, halogen substituted methylene, alkyl substituted methylene, or aryl substituted methylene; $Z_1$ can be an arylene radical or an alkylene group having 0 to 4 carbon atoms; and $Z_2$ can be a halide or a hydroxyl group. The end capping compounds are synthesized by reacting a cyclodiolefin with an olefinic compound according to a Diels-Alder reaction.

BACKGROUND OF THE INVENTION

Polysulfones and polyethers are well known in the prior art. Presently available polysulfones and many polyethers are limited primarily to linear thermoplastic materials. These materials have a wide range of utilities ranging from electrical encapsulation and circuit board compositions to use as a packaging film. In addition, these polymers are normally inexpensive polymers. However, the ultimate use of these prior art polymers is limited by their properties which result from a linear thermoplastic structure. For example, the upper temperature range at which prior art polysulfones remains useful is approximately 300°–350° F. With modern advancements a need has arisen for inexpensive plastic materials which remain useful at higher temperatures and do not become thermoplastic below the resin decomposition temperature.

The present invention relates to stable, high performance aromatic resins. Resins, according to this invention, are produced by a pyrolytic polymerization of prepolymers having reactive terminal groups. Pyrolytic polymerization is the coreaction of the reactive groups located at the terminal ends of the prepolymer upon heating at elevated temperature to cause chain extension and crosslinking of the prepolymer segment.

Polyimide resins have been produced by the pyrolytic polymerization reaction of a polyimide prepolymer having end caps of bicyclo(2.2.1)hept-5-ene-2,3-anhydride as disclosed in U.S. Pat. 3,528,950. The polyimide prepolymer was produced by reacting a diamine with a dianhydride and end capping the chain with a monoanhydride having the structure:

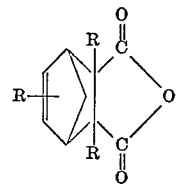

where R is hydrogen or an alkyl group.

Synthesis of compounds similar to the alicyclic end compounds used herein have been disclosed by Diels and Alder in U.S. Pat. 1,944,731. These compounds are produced by reacting a diene with a dienophile to produce a six membered ring compound.

SUMMARY OF THE INVENTION

The high performance aromatic resins of this invention are produced by reacting an aromatic sulfone or ether having an electron donating substituent with an aromatic sulfone or ether having an electron accepting substituent and end capping the polymer chain with a substituted alicyclic endo compound. The substituted sulfone or ether compound can contain aliphatic or aromatic substituents on the aromatic backbone. The polymer chain which is produced by reacting proper stoichiometric amounts of the aromatic sulfone or the aromatic ether is end capped with a substituent alicyclic endo compound having the formula:

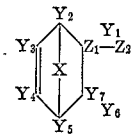

where $Y_1$–$Y_7$, inclusive, may be selected from hydrogen, halogen, nitro, aryl, alkyl having 1 to 6 carbon atoms, alkyl ether having 1 to 6 carbon atoms, or alkaryl; X may be selected from any of carbonyl, oxygen, sulfur, methylene, halogen substituted methylene, alkyl substituted methylene, or aryl substituted methylene; $Z_1$ is an arylene radical or an alkylene radical having 0 to 4 carbon atoms; $Z_2$ may be selected from any of: —Cl, —Br, —I, —ONa, and —OH.

The end capping endo compound is produced by a Diels-Alder reaction wherein a cyclodiolefin having a formula:

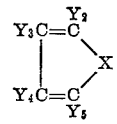

wherein $Y_2$–$Y_5$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene, and aryl substituted methylene is reacted with an olefinic compound having the formula:

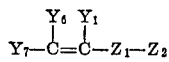

wherein $Y_1$, $Y_6$, and Y may be selected from any of hydrogen, halogen, nitro, aryl, alkyl having 1 to 6 carbon atoms, alkyl ether having 1 to 6 carbon atoms, alkaryl; $Z_1$ is an arylene radical or an alkylene radical having 0 to 4 carbon atoms; and $Z_2$ may be selected from any of —Cl, —Br, —I, —ONa, and —OH.

For example, prepolymer according to the present invention can be made by reacting a disodium salt of bisphenol A with halogenated substituent of the alicyclic endo end cap compound to yield a prepolymer which may be represented ideally as follows:

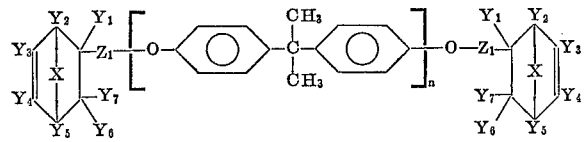

where X. Y, and Z have been defined above and $n=1$.

An example of a polysulfone according to this invention can be made by reacting dichlorodiphenyl sulfone with an oxy sodium salt of the alicyclic endo end cap compound to yield a prepolymer which may be represented ideally as follows:

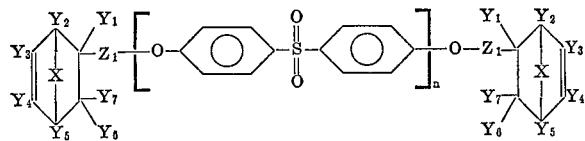

where X. Y, and Z have been defined above and $n=1$.

DISCLOSURE OF THE INVENTION

High performance thermosetting resins according to this invention are made by curing prepolymer prepared by reacting proper stoichiometric amounts of an aromatic sulfone or an aromatic ether and end capping with a substituted alicyclic endo compound. The thermosetting prepolymers are characterized in that they are shelf-stable solids which react through the alicyclic endo compound to form a polymer having good properties in the temperature range of 180° to 225° C. One of the chief advantages of these resins, in addition to their excellent physical, chemical, and thermal properties, is the ease with which articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantial without sacrifice of product properties.

Resins according to this invention are prepared by end-capping a low molecular weight prepolymer chain with a substituted alicyclic endo compound. Substituted alicyclic endo end cap compounds are synthesized by reacting a cyclodiolefin having the formula:

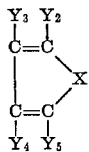

wherein $Y_2-Y_5$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene, and aryl substituted methylene, with an olefinic compound having the formula:

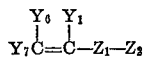

wherein $Y_6$, $Y_7$, and $Y_1$ are selected from the same groups represented by $Y_2-Y_5$; $Z_1$ is an arylene radical or an alkylene radical having 0 to 4 carbon atoms; and $Z_2$ may be selected from any of: —Cl, —Br, —I, —ONa, and —OH. Ideally, the reaction may be represented as follows:

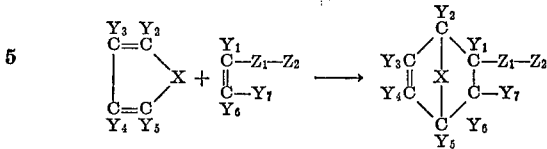

wherein $Y_1-Y_7$, X, $Z_1$, and $Z_2$ have been identified above.

The reaction is carried out in a liquid solvent, such as benzene, and temperatures of the reaction may range from room temperature to about 200° F.

The following table provides a list of a few of the representative cyclodiolefin compounds which are suitable for reaction to produce the alicyclic endo end cap compound.

TABLE I furane
cyclopentadieneone
3,4-diphenylthiophene
cyclopentadiene
methylcyclopentadiene
1,1,2,3,4,5-hexachlorocyclopentadiene The following table provides a list of a few of the representative olefinic compounds which are suitable for reaction to produce the alicyclic endo end cap compound.

TABLE II allyl alcohol
allyl chloride
allyl bromide
ethylene chloride
ethylene bromide The low molecular weight aromatic sulfone or aromatic ether prepolymers may be selected from any of:

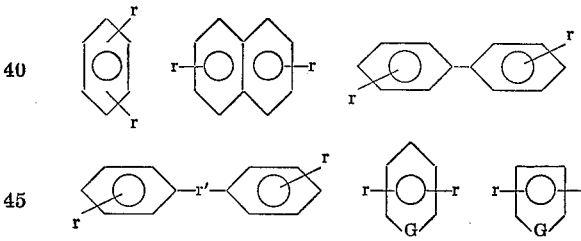

wherein $r$ may be —OH, —Cl, —ONa, —SO$_2$Cl, —Br, or —I; $r'$ is —SO$_2$—, —CH$_2$—, $$-O-, -\underset{\underset{CH_3}{|}}{\overset{\overset{CH_3}{|}}{C}}-$$

or —S—; and G may be oxygen, nitrogen, or sulfur.

An aromatic sulfone ether resin according to this invention may be prepared by reacting an oxysodium salt of a substituted alicyclic endo compound with dichlorodiphenylsulfone. The simplest reaction where $n=1$ may be ideally illustrated as follows:

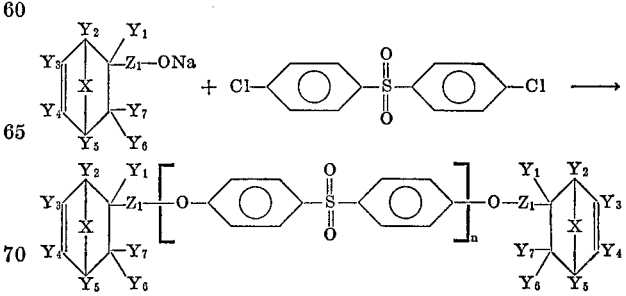

where $Z_1$, $Y_1-Y_7$, and X have been previously identified. The end cap groups may be the same or different monovalent alicyclic endo monovalent radicals. As an alternative, up to about 50% of the alicyclic endo monovalent radical can be replaced by an olefinic radical, for example, vinyl or allyl, which, in effect, will produce a prepolymer having an unsaturated double bond radical as one of the end capped groups.

An aromatic ether resin according to this invention may be prepared by reacting an oxysodium salt of bisphenol A with a chloride substituted alicyclic endo compound. The simplest reaction where $n=1$ may be illustrated ideally as follows:

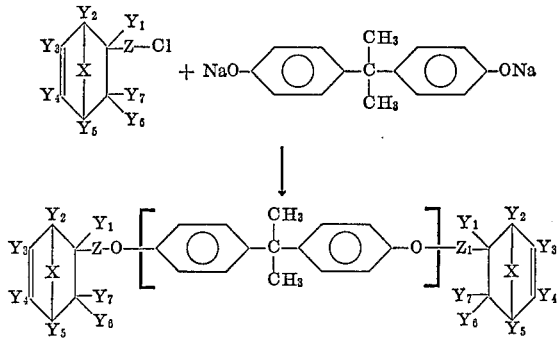

where $Z_1$, $Y_1$-$Y_7$, and X have previously identified. Here again, the end cap groups may be the same or different, or replaced with up to 50% by an olefinic radical.

The prepolymer product of this invention which is obtained by the above illustrative ideal equations may be simply characterized by:

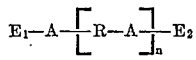

where $E_1$ and $E_2$ are substituted alicyclic endo monvalent radicals having the formula:

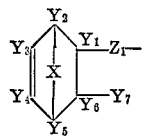

wherein X, $Y_1$-$Y_7$, and $Z_1$ have been previously identified; A is a bivalent radical containing —$SO_2$— or —O—, and R is a bivalent aromatic radical characterized by the formula:

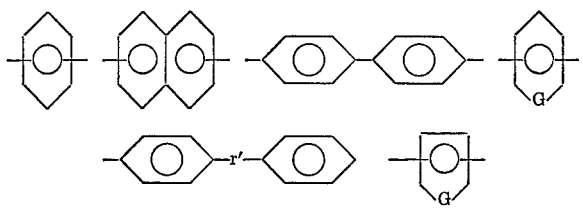

where r' is —$SO_2$—, —$CH_2$—, —O—, —S—, or

G is oxygen, sulfur, or nitrogen; and $n$ is an integer from 1 to 20.

It should be understood that higher molecular weight prepolymers may be synthesized by changing the reactive substituent groups of the reactants. For example, if a prepolymer having repeating units of up to 20 is to be synthesized, an oxysodium salt, a hydroxyl, or other electron accepting reactive substituent on an aromatic sulfone or aromatic ether group is reacted with a sulfone halide, a halide, or other electron donating reactive substituent attached to an aromatic sulfone or ether group in proper stoichiometric proportions to give the predetermined molecular weight. Generally, any aromatic sulfone or aromatic ether compound will be suitable for the purposes of this invention provided it contains either an electron donating or accepting substituent group and the prepolymer formation reaction occurs below about 200° C.

Reaction of the prepolymer to form the polymeric product occurs through the alicyclic endo end capping compounds. While the exact mechanism of the polymeric reaction is not understood, it is postulated that a three-dimensional thermoset polymer is formed when the prepolymer is subjected to temperatures from approximately 230° C. to 370° C. for up to 4 hours. Although pressures are not required to cure the prepolymer, pressures from atmospheric up to about 700 atmospheres may be employed to improve flow and reduce voids. The cure times, temperatures, and pressures are variables which depend on the composition, mass, and shape of the article being produced. For example, the cure for a large mass of neat resin may require a lower temperature applied for a longer period of time at a higher pressure in order to avoid cracking or checking, than a thin impregnated glass laminated article or a small article containing up to 80% by weight inert fillers, such as inorganic salts, metals, or other common filler materials.

In order to enhance product properties, cross-linking agents may be incorporated into the polymer chain. Solid or liquid organic compounds having olefinic unsaturation can be added to the initial starting materials, while gaseous organic olefins are introduced into the starting material by reaction under pressures up to about 3000 p.s.i. Normally, an amount of cross-linking agent equivalent up to 10% by weight of resin at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, furane, crotonic acid, and acrylic acid and halogenated derivatives, phenyl substituted, or methyl substituted forms thereof. Specific examples of a few of the solid olefinic compounds which are suitable crosslinking agents for purposes of this invention are tetraphenylcyclopentadiene, maleic acid and derivatives, cinnamic acid, and stilbene. In addition to the gaseous, liquid, or solid crosslinking agents, crosslinking sites may be built into the polymer chain by the use of polymer reactants having olefinic substitutes; for example, a polyether made from dihydroxy styrene or dihydroxy stilbene. Furthermore, it should be readily apparent to those skilled in the art that various combinations of the above crosslinking agents may be used.

The following examples are illustrative of the procedure used to practice this invention.

EXAMPLE I

Approximately 7 grams of cyclopentadiene and approximately 6 grams of allyl alcohol are mixed in approximately 100 ml. of benzene. The solution is warmed slightly and allowed to stand for 10 hours. The solution is cooled to 0° C. and 2.3 grams of sodium metal is carefully added while maintaining the temperature at 0° C. The solution is filtered, and 2,5-endomethylene-1-oxysodium-1,2,5,6-tetrahydrobenzyl is collected on the filter. The precipitate of the end cap compound is then carefully dried in a vacuum oven at 90° C.

EXAMPLE II

Approximately 30 grams of 2,5-endomethylene-1-oxysodium-1,2,5,6-tetrahydrobenzyl prepared in Example I and approximately 29 grams of dichlorodiphenyl sulfone are dissolved and are mixed in 400 ml. of dimethylformamide. The mixture is heated to 125° C. for 10 hours and is poured into two liters of rapidly stirring water. The solution and water are filtered and a precipitate is collected on the filter. The precipitate is dried overnight at 100° C. in a vacuum oven to yield a powder. A ceramic dish containing the powder is placed in an oven at 300° C.

for 30 minutes and then cooled to room temperature. A rigid, thermoset polymer is formed.

EXAMPLE III

Approximately 30 grams of 2,5-endomethylene-1-oxy-sodium-1,2,5,6-tetrahydrobenzyl prepared in Example I, approximately 30 grams of p-dichlorobenzene and approximately 31 grams of dioxosodiodiphenylsulfone are dissolved and mixed in 600 ml. of dimethylformamide. The mixture is heated to 150° C. for 48 hours and then is poured into four liters of rapidly stirring water. The rapid stirring is continued for 4 hours and the liquid is filtered. A precipitate is collected on the filter, and the precipitate is dried overnight at 110° C. in a vacuum oven to yield a powder. A ceramic dish containing the powder is placed in a room at 300° C. for 30 minutes and then cooled to room temperature. A rigid, thermoset polymer is formed.

What is claimed is:

1. A method of making a thermosetting prepolymer comprising reacting:
(A) sufficient stoichiometric amounts of functionally substituted aromatic compounds to produce 1 to 20 repeating units, said compounds selected from the group consisting of:

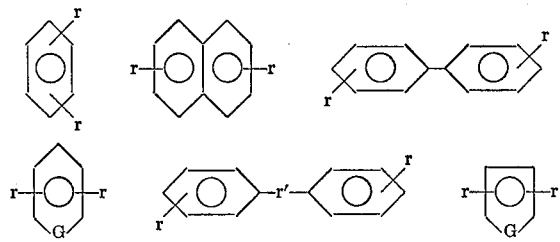

wherein R is —OH, —Cl, —ONa, —SO$_2$Cl, —Br, or —I; r' is —SO$_2$—, —CH$_2$—, —O—, or

and —S—: and G is nitrogen, oxygen, or sulfur; with (B) an end capped compound comprising a substituted alicyclic end compound having the formula:

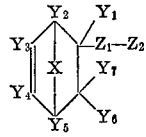

wherein Y$_1$–Y$_7$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; Z$_1$ is selected from the group consisting of an arylene radical and an alkylene radical having 0 to 4 carbon atoms; and Z$_2$ is selected from the group consisting of —Cl, —Br, —I, —ONa, and —OH at temperatures of less than 200° C.

2. A method of making a thermoset polymer wherein the prepolymer of claim 1 is heated in the temperature range of from 230° C. to 370° C. for up to 4 hours.

3. A thermosetting prepolymer characterized by the formula:

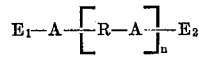

wherein E$_1$ and E$_2$ are substituted alicyclic endo monovalent radicals having the formula:

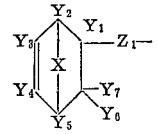

wherein Y$_1$–Y$_7$ is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; Z$_1$ is selected from the group consisting of an arylene radical and an alkylene radical having 0 to 4 carbon atoms; A is the bivalent radical —O— or —SO$_2$—; R is a bivalent aroamtic radical characterized by the formula

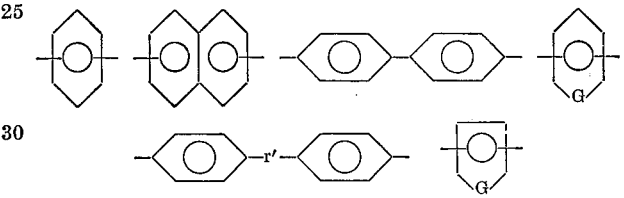

wherein r' is —SO$_2$—, —CH$_2$—, —O—, —S—, or

G is oxygen, nitrogen, or sulfur, and n is an integer from 1 to 20.

4. A thermosetting prepolymer according to claim 3 wherein E$_2$ is replaced by an olefinic radical.

5. A resin product comprising the cured prepolymer of claim 3.

6. A resin product comprising the cured prepolymer of claim 4.

7. A resin product according to claim 3 wherein an olefinic crosslinking agent is added.

References Cited
UNITED STATES PATENTS

| | | | |
|---|---|---|---|
| 3,528,950 | 9/1970 | Lubowitz | 260—78.4 |
| 1,944,731 | 10/1933 | Diels et al. | 260—346.6 |
| 3,549,595 | 8/1970 | Campbell | 260—49 |
| 3,503,931 | 3/1970 | Radlmann et al. | 260—49 |
| 3,634,354 | 1/1972 | Darsow et al. | 260—49 |
| 3,647,751 | 3/1972 | Darsow et al. | 260—49 |
| 3,663,507 | 3/1972 | Vogel | 260—49 |
| 3,663,509 | 5/1972 | Bonnard et al. | 260—49 |

JOSEPH L. SCHOFER, Primary Examiner

J. KIGHT, Assistant Examiner

U.S. Cl. X.R.

260—47 CZ, UA, 49, 79, 79.3 A, 80 P, 397.6